United States Patent
Gao et al.

(10) Patent No.: US 9,503,750 B2
(45) Date of Patent: Nov. 22, 2016

(54) BINARIZATION OF PREDICTION RESIDUALS FOR LOSSLESS VIDEO CODING

(71) Applicant: Futurewei Technologies, Inc., Plano, TX (US)

(72) Inventors: Wen Gao, West Windsor, NJ (US); Minqiang Jiang, Campbell, CA (US); Haoping Yu, Carmel, IN (US)

(73) Assignee: Futurewei Technologies, Inc., Plano, TX (US)

(*) Notice: Subject to any disclaimer, the term of this patent is extended or adjusted under 35 U.S.C. 154(b) by 668 days.

(21) Appl. No.: 13/668,112

(22) Filed: Nov. 2, 2012

(65) Prior Publication Data

US 2013/0114693 A1    May 9, 2013

Related U.S. Application Data

(60) Provisional application No. 61/556,014, filed on Nov. 4, 2011.

(51) Int. Cl.
*H04N 7/26*        (2006.01)
*H04N 19/593*    (2014.01)
(Continued)

(52) U.S. Cl.
CPC .......... *H04N 19/593* (2014.11); *H04N 19/176* (2014.11); *H04N 19/182* (2014.11);
(Continued)

(58) Field of Classification Search
CPC .. H04N 19/11; H04N 19/137; H04N 19/147; H04N 19/174; H04N 19/182; H04N 19/593; H04N 19/91; H04N 7/50; H04N 7/26244; H04N 7/26085; H04N 7/26164; H04N 7/26127

USPC .................................................... 375/240.03
See application file for complete search history.

(56) References Cited

U.S. PATENT DOCUMENTS 5,847,776 A    12/1998    Khmelnitsky et al.
6,125,210 A    9/2000    Yang
(Continued)

FOREIGN PATENT DOCUMENTS

EP            2388999 A2      11/2011
EP      EP 2503783 A1 *    9/2012    ........... H04N 19/176
(Continued)

OTHER PUBLICATIONS

Kim et al, A Lossless Color Image Compression Architecture Using a Parallel Golomb-Rice Hardware CODEC, Nov. 2011.*
(Continued)

*Primary Examiner* — Shan Elahi
(74) *Attorney, Agent, or Firm* — Conley Rose, P.C.

(57) ABSTRACT

A video codec comprising a processor configured to compute a difference between an original pixel and a prediction pixel to generate a prediction residual, and binarize an absolute value of the prediction residual. A method for video coding comprising computing a difference between an original pixel and a prediction pixel to generate a prediction residual, and binarizing an absolute value of the prediction residual. A video encoder comprising a processor configured to set a number of syntax elements to indicate lossless encoding of some or all coding units (CU) in a video frame, a transmitter configured to transmit a bit stream comprising the syntax elements. A method for video encoding comprising setting a number of syntax elements to indicate lossless encoding of some or all coding units (CU) in a video frame, and transmitting a bit stream comprising the syntax elements.

21 Claims, 8 Drawing Sheets

(51) Int. Cl.
| | |
|---|---|
| *H04N 19/91* | (2014.01) |
| *H04N 19/182* | (2014.01) |
| *H04N 19/176* | (2014.01) |
| *H04N 19/147* | (2014.01) |
| *H04N 19/11* | (2014.01) |
| *H04N 19/137* | (2014.01) |
| *H04N 19/174* | (2014.01) |

(52) U.S. Cl.
CPC ............. *H04N 19/91* (2014.11); *H04N 19/11* (2014.11); *H04N 19/137* (2014.11); *H04N 19/147* (2014.11); *H04N 19/174* (2014.11)

(56) References Cited

U.S. PATENT DOCUMENTS

| | | | | |
|---|---|---|---|---|
| 6,272,180 | B1* | 8/2001 | Lei | H04N 19/63 375/240.16 |
| 7,116,830 | B2* | 10/2006 | Srinivasan | 382/236 |
| 7,295,614 | B1 | 11/2007 | Shen et al. | |
| 7,567,617 | B2* | 7/2009 | Holcomb | 375/240.13 |
| 7,599,438 | B2* | 10/2009 | Holcomb et al. | 375/240.23 |
| 7,606,308 | B2* | 10/2009 | Holcomb et al. | 375/240.16 |
| 7,684,488 | B2* | 3/2010 | Marpe | H04N 19/176 375/240.01 |
| 8,184,710 | B2* | 5/2012 | Srinivasan | H04N 19/13 375/240.18 |
| 8,300,696 | B2 | 10/2012 | Liang et al. | |
| 8,331,664 | B2* | 12/2012 | Strom | G06T 9/00 348/426.1 |
| 8,432,968 | B2* | 4/2013 | Ye et al. | 375/240.12 |
| 8,588,459 | B2 | 11/2013 | Bloom et al. | |
| 8,724,697 | B2* | 5/2014 | Lee et al. | 375/240.02 |
| 9,154,792 | B2* | 10/2015 | Chien | H03M 7/4018 |
| 9,167,245 | B2* | 10/2015 | Lou | H04N 19/91 |
| 2002/0034256 | A1* | 3/2002 | Talluri | G06T 9/005 375/240.27 |
| 2002/0163965 | A1* | 11/2002 | Lee | H04N 19/60 375/240.03 |
| 2003/0026335 | A1* | 2/2003 | Thyagarajan | G06T 9/007 375/240.2 |
| 2003/0039396 | A1* | 2/2003 | Irvine | H04N 19/119 382/233 |
| 2003/0095597 | A1* | 5/2003 | Talluri | G06T 9/005 375/240.08 |
| 2003/0118242 | A1* | 6/2003 | Nakayama | H03M 7/46 382/245 |
| 2003/0123742 | A1* | 7/2003 | Zhao | H04N 19/647 382/240 |
| 2004/0045030 | A1* | 3/2004 | Reynolds et al. | 725/110 |
| 2004/0184545 | A1* | 9/2004 | Thyagarajan | G06T 9/007 375/240.23 |
| 2005/0013500 | A1* | 1/2005 | Lee | H04N 19/176 382/251 |
| 2005/0025246 | A1* | 2/2005 | Holcomb | H04N 19/176 375/240.23 |
| 2005/0038837 | A1 | 2/2005 | Marpe et al. | |
| 2005/0078754 | A1* | 4/2005 | Liang et al. | 375/240.18 |
| 2005/0219069 | A1* | 10/2005 | Sato | H04N 19/176 341/50 |
| 2005/0222775 | A1* | 10/2005 | Kisra et al. | 702/14 |
| 2005/0231396 | A1* | 10/2005 | Dunn | 341/50 |
| 2005/0253740 | A1* | 11/2005 | Marpe et al. | 341/50 |
| 2006/0013320 | A1 | 1/2006 | Oguz et al. | |
| 2006/0071826 | A1* | 4/2006 | Saunders et al. | 341/50 |
| 2006/0093031 | A1* | 5/2006 | Van Der Schaar | H04N 19/61 375/240.01 |
| 2006/0103556 | A1* | 5/2006 | Malvar | H03M 7/40 341/63 |
| 2006/0120450 | A1* | 6/2006 | Han | H04N 19/176 375/240.03 |
| 2006/0222066 | A1 | 10/2006 | Yoo et al. | |
| 2007/0074266 | A1* | 3/2007 | Raveendran et al. | 725/135 |
| 2007/0081586 | A1* | 4/2007 | Raveendran et al. | 375/240.1 |
| 2007/0081587 | A1* | 4/2007 | Raveendran et al. | 375/240.1 |
| 2007/0140345 | A1* | 6/2007 | Osamoto et al. | 375/240.16 |
| 2007/0171969 | A1 | 7/2007 | Han et al. | |
| 2007/0171985 | A1* | 7/2007 | Kim | H04N 19/176 375/240.26 |
| 2007/0217703 | A1* | 9/2007 | Kajiwara | H04N 19/91 382/238 |
| 2008/0037656 | A1* | 2/2008 | Hannuksela | 375/240.26 |
| 2008/0120676 | A1* | 5/2008 | Morad et al. | 725/127 |
| 2008/0240240 | A1* | 10/2008 | Kodama | H04N 19/56 375/240.14 |
| 2009/0034857 | A1 | 2/2009 | Moriya et al. | |
| 2009/0097558 | A1* | 4/2009 | Ye et al. | 375/240.13 |
| 2009/0129469 | A1* | 5/2009 | Kimiyama | H04N 19/159 375/240.15 |
| 2009/0161759 | A1* | 6/2009 | Seo | H04N 19/176 375/240.12 |
| 2009/0220005 | A1 | 9/2009 | Kim et al. | |
| 2009/0225834 | A1 | 9/2009 | Song et al. | |
| 2010/0054615 | A1 | 3/2010 | Choi et al. | |
| 2010/0054616 | A1 | 3/2010 | Kim | |
| 2010/0080284 | A1* | 4/2010 | Lee et al. | 375/240.02 |
| 2010/0080285 | A1* | 4/2010 | Lee et al. | 375/240.02 |
| 2010/0080296 | A1* | 4/2010 | Lee et al. | 375/240.16 |
| 2010/0104022 | A1 | 4/2010 | Chatterjee et al. | |
| 2010/0118943 | A1 | 5/2010 | Shiodera et al. | |
| 2010/0172409 | A1* | 7/2010 | Reznik et al. | 375/240.2 |
| 2010/0260260 | A1* | 10/2010 | Wiegand | H04N 19/30 375/240.12 |
| 2010/0266008 | A1* | 10/2010 | Reznik | 375/240.2 |
| 2010/0284613 | A1* | 11/2010 | Tsai | H03M 7/40 382/166 |
| 2011/0080947 | A1 | 4/2011 | Chen et al. | |
| 2011/0150085 | A1* | 6/2011 | Andrijanic et al. | 375/240.12 |
| 2011/0158323 | A1 | 6/2011 | Chen et al. | |
| 2011/0206289 | A1* | 8/2011 | Dikbas | H04N 19/00484 382/238 |
| 2011/0243230 | A1 | 10/2011 | Liu | |
| 2011/0248873 | A1* | 10/2011 | Karczewicz et al. | 341/67 |
| 2011/0280314 | A1* | 11/2011 | Sankaran | G06F 9/3877 375/240.25 |
| 2011/0293001 | A1 | 12/2011 | Lim et al. | |
| 2012/0008682 | A1 | 1/2012 | Karczewicz et al. | |
| 2012/0014436 | A1 | 1/2012 | Segall et al. | |
| 2012/0027077 | A1* | 2/2012 | Reznik | H03M 7/40 375/240.2 |
| 2012/0082215 | A1* | 4/2012 | Sze | H04N 19/436 375/240.03 |
| 2012/0134425 | A1* | 5/2012 | Kossentini et al. | 375/240.25 |
| 2012/0163471 | A1* | 6/2012 | Karczewicz et al. | 375/240.23 |
| 2012/0170650 | A1 | 7/2012 | Chong et al. | |
| 2012/0170662 | A1* | 7/2012 | Karczewicz et al. | 375/240.18 |
| 2012/0236931 | A1* | 9/2012 | Karczewicz et al. | 375/240.02 |
| 2012/0243608 | A1* | 9/2012 | Yu | H04N 19/176 375/240.12 |
| 2013/0016777 | A1 | 1/2013 | Gao et al. | |
| 2013/0101033 | A1* | 4/2013 | Joshi | H03M 7/3068 375/240.12 |
| 2013/0101036 | A1 | 4/2013 | Zhou | |
| 2013/0114676 | A1* | 5/2013 | Guo et al. | 375/240.02 |
| 2013/0114696 | A1 | 5/2013 | Liu | |
| 2013/0114738 | A1* | 5/2013 | Chien et al. | 375/240.24 |
| 2013/0271566 | A1* | 10/2013 | Chen et al. | 348/43 |
| 2013/0272377 | A1* | 10/2013 | Karczewicz et al. | 375/240.02 |
| 2013/0287103 | A1* | 10/2013 | Seregin et al. | 375/240.12 |

FOREIGN PATENT DOCUMENTS

| | | | | |
|---|---|---|---|---|
| WO | | 2004064406 A1 | 7/2004 | |
| WO | WO | 2011069412 A1 * | 6/2011 | .......... H04N 19/176 |
| WO | | 2011128268 A1 | 10/2011 | |

OTHER PUBLICATIONS

Bjontegaard, G., "H.26L Test Model Long Term No. 8 (TML-8) Draft0," ITU Telecommunications Standardization Sector, Study Group 16, Video Coding Experts Group (VCEG), VCEG-Nxx, Apr. 2, 2001, pp. 1-2, 16-19.

(56) References Cited

OTHER PUBLICATIONS

Bross, B. et al., "WD4: Working Draft 4 of High-Efficiency Video Coding," Joint Collaborative Team on Video Coding (JCT-VC) of ITU-T SG16 WP3 and ISO/IEC JTC1/SC29/WG11, 6th Meeting: Torino, IT, JCTVC-F803 d0, Jul. 14-22, 2011, pp. 1-215.

Davies, T. et al., "Suggestion for a Test Model," Joint Collaborative Team on Video Coding (JCT-VC) of ITU-T SG16 WP3 and ISO/IEC JTC1/SC29NVG11, 1st Meeting: Dresden, DE, 2010, JCTVC-A033, Apr. 15-23, pp. 1-30.

Gao, W. et al., "A Lossless Coding Solution for HEVC," Joint Collaborative Team on Video Coding (JCT-VC) of ITU-T SG16 WP3 and ISO/IEC JTC1/SC29/WG11, 7th Meeting: Geneva, CH; 2011, JCTVC-G664, Nov. 21-30, pp. 1-7.

Howard, P. et al., "Fast and Efficient Lossless Image Compression," Data Compression Conference, IEEE Computer Society Press, XP000614252, Mar. 30, 1993, pp. 351-360.

Nan, Z., et al., "Spatial Prediction Based Intra-Coding," 2004 IEEE International Conference on Multimedia and Expo (ICME), vol. 1, Jun. 27-30, 2004, pp. 97-100.

Nguyen, T. et al., "Reduced-complexity Entropy Coding of Transform Coefficient Levels Using a Combination of VLC and PIPE," Joint Collaborative Team on Video Coding (JCT-VC) of ITU-T SG16 WP3 and ISO/IEC JTC1/SC29/WG11, retrieved from: http://wftp3.itu.int/av-arch/jctvc-site/, 4th Meeting: Daegu, KR, JCTVC-D336, Jan. 20-28, 2011, pp. 1-8.

"Working Draft No. 2, Revision 0 (WD-2)," Joint Video Team (JVT) of ISO/IEC MPEG and ITU-T VCEG, Pattaya, Thailand, JVT-B118, Dec. 3-7, 2001, pp. 1, 3-100.

Ye, Y., et al., "Improved H.264 Intra Coding Based on Bi-directional Intra Prediction, Directional Transform, and Adaptive Coefficient Scanning," IEEE International Conference on Image Processing, Oct. 12-15, 2008, pp. 2116-2119.

Foreign Communication From A Counterpart Application, PCT Application PCT/US2012/063427, Partial International Search Report, dated Jan. 28, 2013, 8 pages.

Foreign Communication From A Counterpart Application, PCT Application PCT/US2012/063428, Partial International Search Report, dated Jan. 28, 2013, 8 pages.

Foreign Communication From A Counterpart Application, PCT Application PCT/US2012/063428, International Search Report dated Apr. 4, 2013, 8 pages.

Foreign Communication From A Counterpart Application, PCT Application PCT/US2012/063428, Written Opinion dated Apr. 4, 2013, 10 pages.

Bossen, F., et al., "Common Test Conditions and Software References Configurations," JCTVC-F900, Torino, Italy, Jul. 2011, 3 pages.

"Vision, Application and Requirements for High Efficiency Video Coding (HEVC)," ISO/IEC JTC1/SC291WG11/N11872, Daegu, Korea, Jan. 2011, 6 pages.

Office Action dated Dec. 31, 2014, 33 pages, U.S. Appl. No. 13/668,094, filed Nov. 2, 2012.

Office Action dated Jul. 2, 2015, 31 pages, U.S. Appl. No. 13/668,094, filed Nov. 2, 2012.

Notice of Allowance dated Sep. 17, 2015, 13 pages, U.S. Appl. No. 13/668,094, filed on Nov. 2, 2012.

Notice of Allowance dated Nov. 12, 2015, 6 pages, U.S. Appl. No. 13/668,094, filed on Nov. 2, 2012.

\* cited by examiner

BINARIZATION OF PREDICTION RESIDUALS FOR LOSSLESS VIDEO CODING

CROSS-REFERENCE TO RELATED APPLICATIONS

The present application claims priority to U.S. Provisional Patent Application No. 61/556,014 filed Nov. 4, 2011 by Wen Gao et al. and entitled "New Lossless Coding Tools for Compound Video", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, which may result in difficulties when the data is to be streamed or otherwise communicated across a communications network with limited bandwidth capacity. Thus, video data is generally compressed before being communicated across modern day telecommunications networks. Video compression devices often use software and/or hardware at the source to code the video data prior to transmission, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

For example, video compression may encode prediction residuals (representing a difference between an original pixel and a prediction pixel) instead of original pixels to reduce bit rate. The prediction residuals may be transformed and quantized leading to quantized transform coefficients, which may then be binarized. Existing binarization schemes may have been designed for relatively small quantized transform coefficients, thus when binarizing relatively large transform coefficients, the existing binarization schemes may be inefficient.

SUMMARY

In one embodiment, the disclosure includes a video codec comprising a processor configured to compute a difference between an original pixel and a prediction pixel to generate a prediction residual, and binarize an absolute value of the prediction residual.

In another embodiment, the disclosure includes a method for video coding comprising computing a difference between an original pixel and a prediction pixel to generate a prediction residual, and binarizing an absolute value of the prediction residual.

In yet another embodiment, the disclosure includes a video encoder comprising a processor configured to set a number of syntax elements to indicate lossless encoding of some or all coding units (CU) in a video frame, a transmitter configured to transmit a bit stream comprising the syntax elements.

In yet another embodiment, the disclosure includes a method for video encoding comprising setting a number of syntax elements to indicate lossless encoding of some or all coding units (CU) in a video frame, and transmitting a bit stream comprising the syntax elements.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
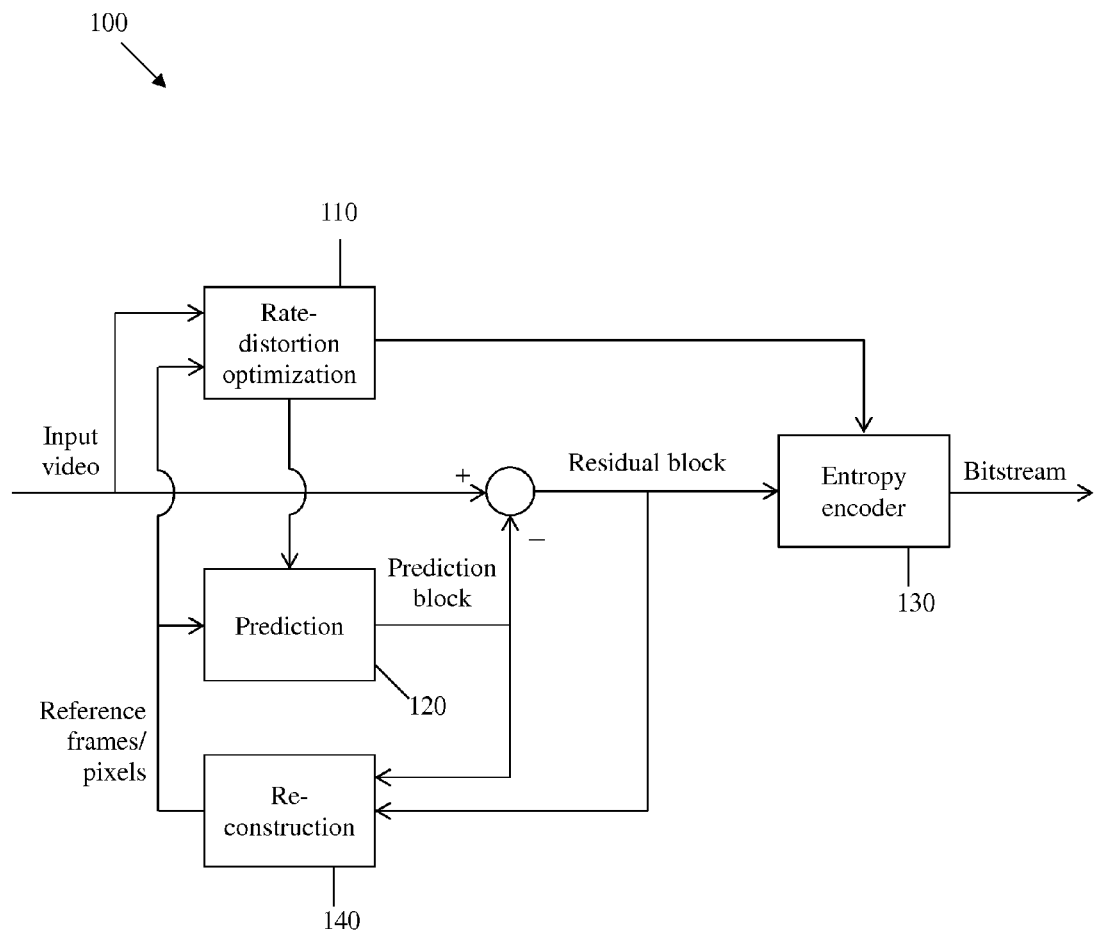
FIG. 1 is a schematic diagram of an embodiment of a transform bypass encoding scheme.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture samples or pixels, each of which may represent a single reference point in the frame. During digital processing, each pixel may be assigned an integer value (e.g., 0, 1, ... or 255) that represents an image quality or characteristic, such as luminance (luma or Y) or chrominance (chroma including U and V), at the corresponding reference point. In use, an image or video frame may comprise a large amount of pixels (e.g., 2,073,600 pixels in a 1920×1080 frame), thus it may be cumbersome and inefficient to encode and decode (referred to hereinafter simply as code) each pixel independently. To improve coding efficiency, a video frame is usually broken into a plurality of rectangular blocks or macroblocks, which may serve as basic units of processing such as prediction, transform, and quantization. For example, a typical N×N block may comprise $N^2$ pixels, where N is an integer and often a multiple of four.

In working drafts of the International Telecommunications Union (ITU) Telecommunications Standardization Sector (ITU-T) and the International Organization for Standardization (ISO)/International Electrotechnical Commission (IEC) high efficiency video coding (HEVC), which is poised to be a future video standard, new block concepts have been introduced. For example, coding unit (CU) may refer to a sub-partitioning of a video frame into rectangular blocks of equal or variable size. In HEVC, a CU may replace a macroblock structure of previous standards. Depending on a mode of inter or intra prediction, a CU may comprise one or more prediction units (PUs), each of which may serve as a basic unit of prediction. For example, for intra prediction, a 64×64 CU may be symmetrically split into four 32×32 PUs. For another example, for an inter prediction, a 64×64 CU may be asymmetrically split into a 16×64 PU and a 48×64 PU. Similarly, a PU may comprise one or more transform units (TUs), each of which may serve as a basic unit for transform and/or quantization. For example, a 32×32 PU may be symmetrically split into four 16×16 TUs. Multiple TUs of one PU may share a same prediction mode, but may be transformed separately. Herein, the term block may generally refer to any of a macroblock, CU, PU, or TU.

Depending on the application, a block may be coded in either a lossless mode (i.e., no distortion or information loss) or a lossy mode (i.e., with distortion). In use, high quality videos may be coded using a lossless mode, while low quality videos may be coded using a lossy mode. Sometimes, a single video frame or slice (e.g., with YUV sub-sampling of either 4:4:4 or 4:2:0) may employ both lossless and lossy modes to code a plurality of regions, which may be rectangular or irregular in shape. Each region may comprise a plurality of blocks. For example, a compound video may comprise a combination of different types of contents, such as texts, computer graphics, and natural-view content (e.g., camera-captured video). In a compound frame, regions of texts and graphics may be coded in a lossless mode, while regions of natural-view content may be coded in a lossy mode. Lossless coding of texts and graphics may be desired, e.g. in computer screen sharing applications, since lossy coding may lead to poor quality or fidelity of texts and graphics and cause eye fatigue. Due to lack of a lossless coding mode, the coding efficiency of current HEVC test models (HMs) for certain videos (e.g., compound video) may be limited.

When coding a block, a prediction block may be generated based on one or more previously coded reference blocks. The prediction block may be an estimated version of the block. A residual block may be generated by subtracting the block from the prediction block, or vice versa, which may represent prediction residuals or errors. A residual value of the residual block may also be used to represent the prediction residual. Since an amount of data needed to represent the prediction residuals may typically be less than an amount of data needed to represent the original block, the residual block may be encoded to achieve a higher compression ratio.

In lossy coding schemes of current HMs, through a two-dimensional transform, e.g. a transform that closely resembles discrete cosine transform (DCT), residual values of the residual block in a spatial domain may be converted to transform coefficients in a frequency domain. In a transform matrix, low-index transform coefficients (e.g., in a top-left section), e.g., corresponding to big spatial features with low spatial frequency components, may have relatively high magnitudes, while high-index transform coefficients (e.g., in a bottom-right section), e.g., corresponding to small spatial features with high spatial frequency components, may have relatively small magnitudes. Further, in a following quantization operation, a number of high-index transform coefficients may be reduced to zero, which may be skipped in subsequent coding steps. Since zero transform coefficients may be concentrated in a bottom-right section of the transform matrix, an end of block (EOB) symbol may be used to indicate a last non-zero transform coefficient.

Both the sign (positive or negative) and absolute value of each non-zero transform coefficient may be encoded. Herein, the term "absolute value" may also be interchangeably referred to as "level", which is always a non-negative integer. In use, a level or absolute value may be represented by binary values (e.g., 1 and 0). Accordingly, a binarization process may be used to map the absolute value onto a set of bin strings. Each bin string comprises a number of bits, and each bit may be referred to as a bin.

In current HMs, a transform coefficient level, denoted as |T| for illustration, is binarized using different schemes depending on the value of |T|. For example, if |T| equals 1 or 2, it may be binarized using a unary code, e.g., as a bin string "0" or "10" respectively. Otherwise if |T|≥3, the value 3 may be binarized as a bin string "11" indicating a maximum value for a first part of the binarization. A second part of the binarization (i.e., |T|−3) may be coded using truncated Golomb-Rice (TR) codes, where all bins of the Golomb-Rice codewords are coded in a CABAC bypass mode. The TR codes may be used for |T|−3 up to a specific limit denoted as cTRMax. Thus, if |T|−3≥cTRMax, a third part of the binarization (i.e., |T|−3−cTRMax−1) may be coded using a zero-th (0-th) order exponential Golomb (EG) code in a bypass mode.

The limit cTRMax may be a pre-configured variable, which depends on a Golomb-Rice parameter denoted as cRiceParam. In current HMs, cRiceParam and cTRMax may be specified as in Table 1:

TABLE 1

Specification of TRMax depending on cRiceParam

| cRiceParam | cTRMax |
|---|---|
| 0 | 7 |
| 1 | 20 |
| 2 | 42 |
| 3 | 70 |

The parameter cRiceParam may be adaptively updated after encoding each transform coefficient. In current HMs, cRiceParam may be using the following formula:

$$k_{t+1} = \begin{cases} 0 & value_t \in [0,1] \wedge k_t < 1 \\ 1 & value_t \in [2,3] \wedge k_t < 2 \\ 2 & value_t \in [4, n_{k_t}] \wedge k_t < 3 \\ 3 & value_t > n_{k_t} \wedge k_t < 4 \\ k_t & \text{otherwise} \end{cases} \quad (1)$$

$$n_0 = 12, n_1 = 10, n_2 = 9, n_3 = 0$$

where $k_t$ denotes the current cRiceParam for a current transform coefficient, $k_{t+1}$ denotes an updated cRiceParam for a next transform coefficient, $value_s$ denotes the current transform coefficient level minus 3 (i.e., |T|−3), and n denotes an intermediate parameter. Suppose that $k_t$=2 and value$_t$=11, we then have n$_2$=9, value$_t$>9, and k$_t$<4. Thus, based on formula (1), cRiceParam is updated as k$_{t+1}$=3.

The binarization scheme in current HMs as described above may have been designed for encoding quantized transform coefficients, which normally have relatively small absolute values. However, in lossless coding, prediction residuals may be encoded directly without transform or quantization steps. Prediction residuals may exhibit different statistics properties from transform coefficients. For example, prediction residuals with high absolute values may appear anywhere in a residual block, e.g., in the bottom-right section or top-right section. This distribution may be different compared to transform coefficients which typically have small or zero absolute values in the bottom right section. Further, without quantization, prediction residuals may often have absolute values higher than the parameter cTRMax, in which case three encoding schemes have to be used, lowering encoding efficiency. Thus, it is desirable to alleviate or eliminate issues in the existing binarization scheme by modifying its parameters and/or algorithms.

Disclosed herein are systems and methods for improved coding of syntax elements such as prediction residuals used in lossless coding. Prediction residuals may be directly binarized without going through transform and quantization steps. Depending on the absolute value of a prediction residual, denoted as |R|, its binary representation may include one, two, or three parts. In an embodiment, if |R| equals 1 or 2, it may be binarized using a unary code. Otherwise if |R| is between 3 and the preconfigured parameter 'cTRMax+3', |R|−3 may be binarized as two parts, wherein a first part as bin string '11' and a second part binarized using a TR code. Otherwise if |R| is greater than cTRMax+3, |R| may be binarized as three parts, wherein a first part as bin string '11', a second part binarized using the TR code, and a third part binarized using an k-th order EG code, wherein k is a positive integer. In an embodiment, after binarizing each prediction residual, the cRiceParam may be adaptively updated, so that a next prediction residual may be more efficiently binarized. Further, this disclosure teaches mechanisms to indicate whether a whole image or video frame is encoded using a lossless encoding scheme, or some CUs in the video frame is encoded using the lossless encoding scheme. To inform a decoder about lossless encoding, a number of syntax elements may be set in a bit stream comprising encoded prediction residuals.

FIG. 1 illustrates an embodiment of a transform bypass encoding scheme 100, which may be implemented in a video encoder. The transform bypass encoding scheme 100 may comprise a rate-distortion optimization (RDO) module 110, a prediction module 120, an entropy encoder 130, and a reconstruction module 140 arranged as shown in FIG. 1. In operation, an input video comprising a sequence of video frames (or slices) may be received by the encoder. Herein, a frame may refer to any of a predicted frame (P-frame), an intra-coded frame (I-frame), or a bi-predictive frame (B-frame). Likewise, a slice may refer to any of a P-slice, an I-slice, or a B-slice.

The RDO module 110 may be configured to make logic decisions for one or more of other modules. In an embodiment, based on one or more previously encoded frames, the RDO module 110 may determine how a current frame (or slice) being encoded is partitioned into a plurality of CUs, and how a CU is partitioned into one or more PUs and TUs. For example, homogeneous regions of the current frame (i.e., no or slight difference among the pixel values in the regions) may be partitioned into relatively larger blocks, and detailed regions of the current frame (i.e., significant difference among the pixel values in the regions) may be partitioned into relatively smaller blocks.

In addition, the RDO module 110 may control the prediction module 120 by determining how the current frame is predicted. The current frame may be predicted via inter and/or intra prediction. Inter prediction (i.e., inter frame prediction) may exploit temporal redundancies in a sequence of frames, e.g. similarities between corresponding blocks of successive frames, to reduce compression data. In inter prediction, the RDO module 110 may determine a motion vector of a block in the current frame based on a corresponding block in one or more reference frames. On the other hand, intra prediction may exploit spatial redundancies within a single frame, e.g., similarities between adjacent blocks, to reduce compression data. In intra prediction, reference pixels adjacent to a current block may be used to generate a prediction block. Intra prediction (i.e., intra frame prediction) may be implemented using any of a plurality of available prediction modes or directions (e.g., 35 modes for luma components in HEVC), which may be determined by the RDO module 110. For example, the RDO module 110 may calculate a sum of absolute difference (SAD) for each prediction mode, and select a prediction mode that results in the smallest SAD.

Based on logic decisions made by the RDO module 110, the prediction module 120 may utilize either one or more reference frames (inter prediction) or a plurality of reference pixels (intra prediction) to generate a prediction block, which may be an estimate of a current block. Then, the current block may be subtracted by the prediction block, thereby generating a residual block. The residual block may comprise a plurality of residual values, each of which may indicate a difference between a pixel in the current block and a corresponding pixel in the prediction block. Then, all values of the residual block may be scanned and encoded by the entropy encoder 130 into an encoded bitstream. The entropy encoder 130 may employ any entropy encoding scheme, such as context-adaptive binary arithmetic coding (CABAC) encoding, exponential Golomb encoding, or fixed length encoding, or any combination thereof. In the transform bypass encoding scheme 100, since the residual block is encoded without a transform step or a quantization step, no information loss may be induced in the encoding process.

To facilitate continuous encoding of video frames, the residual block may also be fed into the reconstruction module 140, which may generate either reference pixels for intra prediction of future blocks or reference frames for inter prediction of future frames. If desired, filtering may be performed on the reference frames/pixels before they are used for inter/intra prediction. A person skilled in the art is familiar with the functioning of the prediction module 120 and the reconstruction module 140, so these modules will not be further described. It should be noted that FIG. 1 may be a simplified illustration of a video encoder, thus it may only include a portion of modules present in the encoder. Other modules (e.g., filter, scanner, and transmitter), although not shown in FIG. 1, may also be included to facilitate video encoding. Prior to transmission from the encoder, the encoded bitstream may be further configured to include other information, such as video resolution, frame rate, block partitioning information (sizes, coordinates), prediction modes, etc., so that the encoded sequence of video frames may be properly decoded.

Figure 2:
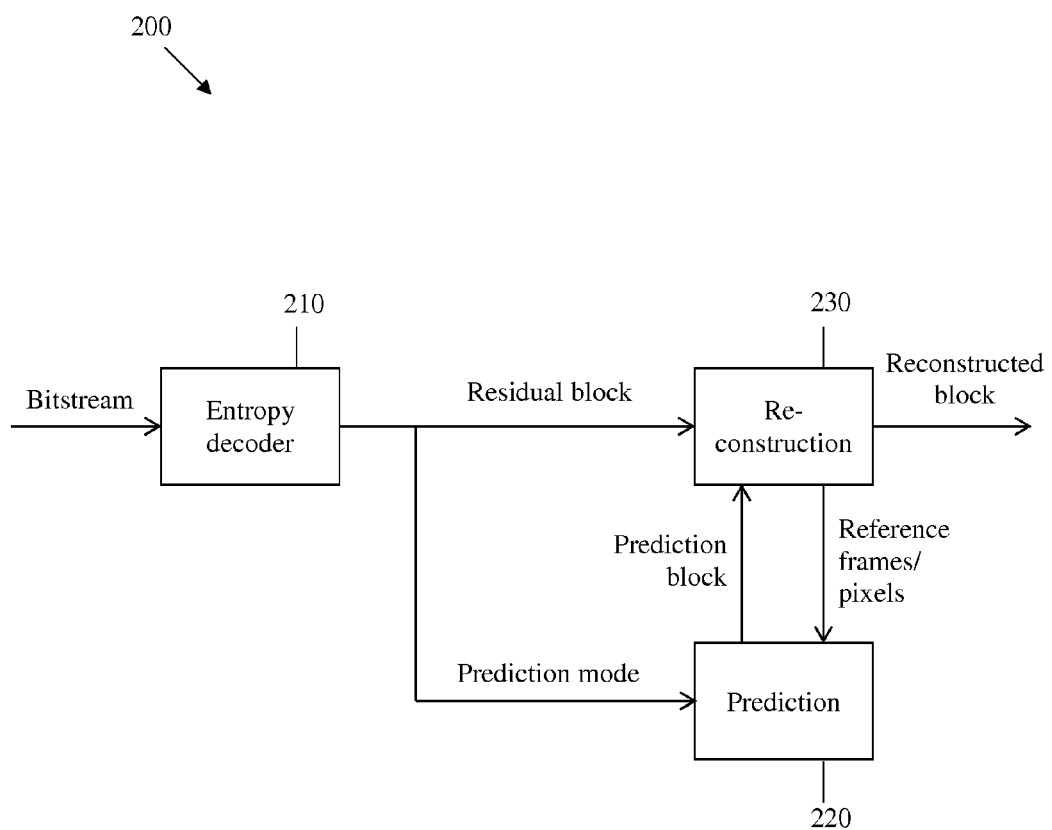
FIG. 2 is a schematic diagram of an embodiment of a transform bypass decoding scheme.

FIG. 2 illustrates an embodiment of a transform bypass decoding scheme 200, which may be implemented in a video decoder. The transform bypass decoding scheme 200 may correspond to the transform bypass encoding scheme 100, and may comprise an entropy decoder 210, a prediction module 220, and a reconstruction module 230 arranged as shown in FIG. 2. In operation, an encoded bitstream containing information of a sequence of video frames may be received by the entropy decoder 210, which may decode the bitstream to an uncompressed format. The entropy decoder 210 may employ any entropy decoding scheme, such as CABAC decoding, exponential Golomb decoding, or fixed length encoding, or any combination thereof.

For a current block being decoded, a residual block may be generated after the execution of the entropy decoder 210. In addition, information containing a prediction mode of the current block may also be decoded by the entropy decoder 210. Then, based on the prediction mode, the prediction module 220 may generate a prediction block for the current block. If the prediction mode is an inter mode, one or more previously decoded reference frames may be used to generate the prediction block. Otherwise, if the prediction mode is an intra mode, a plurality of previously decoded reference pixels may be used to generate the prediction block. Then, the reconstruction module 230 may combine the residual block with the prediction block to generate a reconstructed block. Additionally, to facilitate continuous decoding of video frames, the reconstructed block may be used in a reference frame to inter predict future frames. Some pixels of the reconstructed block may also serve as reference pixels for intra prediction of future blocks in the same frame.

In use, if an original block is encoded and decoded using lossless schemes, such as the transform bypass encoding scheme 100 and the transform bypass decoding scheme 200, no information loss may be induced in the entire coding process. Thus, barring distortion caused during transmission, a reconstructed block may be exactly the same with the original block. This high fidelity of coding may improve a user's experience in viewing video contents such as texts and graphics.

When a transform bypass encoding scheme is used, all residual values may be scanned and encoded using an entropy encoder. Without a transform step to concentrate non-zero residual values in the top-left corner of the transform matrix, the non-zero residual values may appear in random positions of the residual block. Further, in contrast with non-zero transform coefficients whose absolute values (i.e., levels) are typically larger in the top-left corner and smaller in the bottom-right corner, non-zero residual levels may also be relatively more randomly distributed in the residual block. For example, a peak residual level may appear at any position, such as the most top-left, the most bottom-right position, or any other position. Thus, the probability of large residual levels appearing in the bottom-right corner of the residual block may still be significant.

Figure 3:
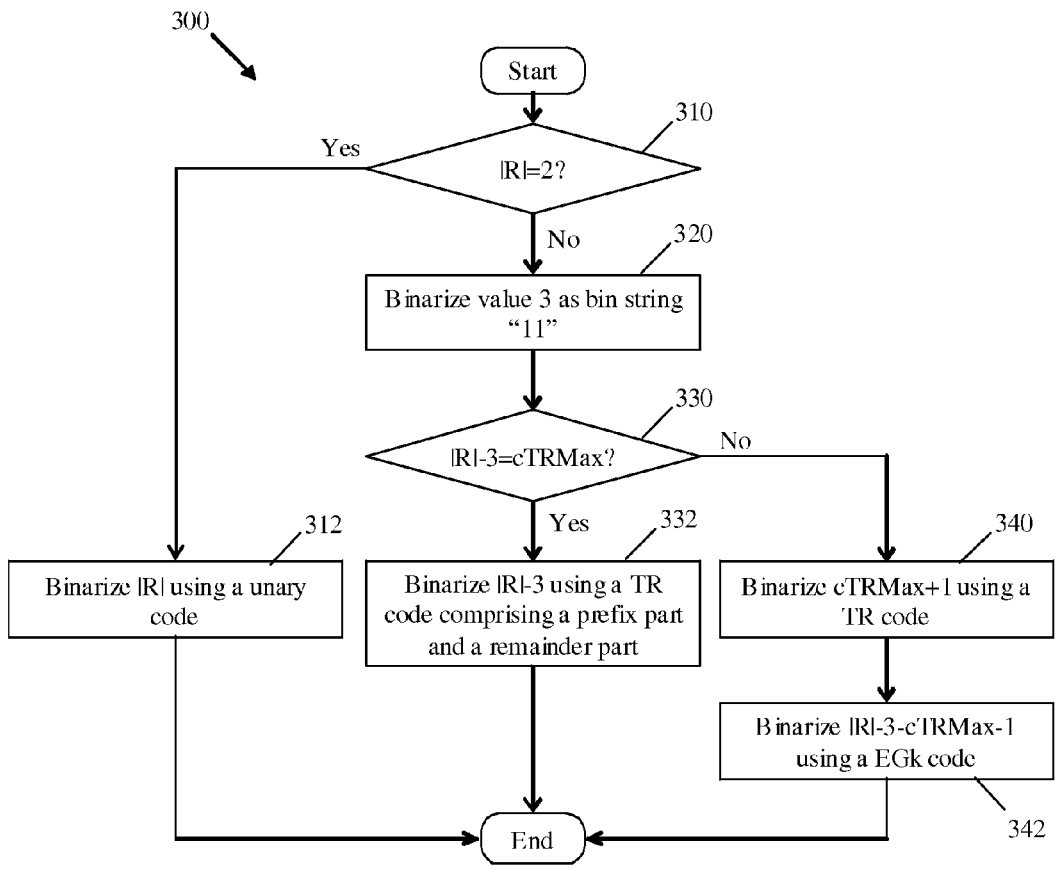
FIG. 3 is a flowchart of an embodiment of a binarization method.

As mentioned previously, the existing binarization scheme may not be suitable to encode syntax elements with high absolute values. This issue may be alleviated by modifying configuration of parameters and/or algorithms. FIG. 3 illustrates an embodiment of a binarization method 300. In a lossless encoding scheme such as the scheme 100, the syntax element being binarized may be non-zero prediction residual levels denoted as |R|. Although, it should be understood that any other type of syntax elements may also be similarly encoded using the binarization method 300.

In step 310, the method 300 may check whether $|R| \leq 2$. If the condition in step 310 is met, the method 300 may proceed to step 312; otherwise, the method 300 may proceed to step 320. In step 312, |R| may be binarized using the existing binarization scheme. For example, if |R| equals 1 or 2, it may be binarized as a bin string "0" or "10" respectively. In step 320, the value 3 may be coded using a bin string "11", which represents the first part of the binarization for |R|. Next, in step 330, the method 300 may check whether $|R|-3 \leq cTRMax$, wherein cTRMax is a pre-configured parameter depending on cRiceParam. If the condition in step 330 is met, the method 300 may proceed to step 332; otherwise, the method 300 may proceed to step 340.

In step 332, the syntax element of '|R|-3' may be binarized using a TR code, which represents the second part of the binarization for |R|. In an embodiment of the TR code, '|R|-3' may be decomposed into a prefix part (denoted as p) and a suffix or remainder part (denoted as r), which are then binarized differently. For a specific cRiceParam, the prefix and reminder parts may be computed via the following equations:

$$p=(|R|-3)>>cRiceParam \quad (2)$$

$$r=(|R|-3)-(p<<cRiceParam) \quad (3)$$

The prefix part p in equation (2) may be binarized using a truncated unary (TU) code. In the TU code, p may first be compared with a parameter denoted as cMax and computed as: cMax=cTRMax>>cRiceParam. If p<cMax, p may be binarized as a bin string of length (p+1), wherein the first p bits each has a value of 1 and the last bit has a value of 0. Suppose, for example, that p=6<cMax, then the bin string for p is 1111110. Otherwise if p=cMax, p may be binarized as a bin string of length cMax, wherein all bins in the bin string are 1. Suppose that p=6=cMax, then the bin string for p is 111111.

In an embodiment, a valid range of cRiceParam is expanded from [0,3] (i.e., range in existing binarization scheme) to [0,n], wherein n is an integer greater than 3. In an embodiment, n=5. Further, since each cRiceParam determines a cTRMax, an embodiment of cRiceParam and cTRMax correspondence may be specified as Table 2:

TABLE 2

Specification of cTRMax depending on cRiceParam

| cRiceParam | cTRMax |
|---|---|
| 0 | 7 |
| 1 | 20 |
| 2 | 42 |
| 3 | 70 |
| 4 | 142 |
| 5 | 252 |

Note that, when cRiceParam is in range [0,3], cTRMax may have the same values as the existing binarization scheme (shown in Table 1). When cRiceParam equals 4 or 5, its optimal corresponding cTRMax may be determined empirically via simulations or tests. Thus, it is possible to develop cTRMax values that are different from Table 2. By increasing cTRMax values which determine the TR coding limit, larger absolute values of prediction residuals may now be coded using the TR code. Further, since cRiceParam is also expanded, a larger '|R|-3' may still result in a relatively small p, which reduces the number of necessary bits to binarize '|R|-3'.

On the other hand, the remainder part r may be binarized using a fixed-length code, which may have a length of cRiceParam. The indexing of bins for the fixed-length bin string may be such that the first bin index relates to the most significant bit with increasing values of bin index towards the least significant bit.

If in step 330, it is determined that |R|−3>cTRMax, the method 300 may proceed to step 340, where the value of 'cTRMax+1' may first be binarized using the TR code. Similar to the step 332, a prefix part and a remainder part may be binarized separately. Next, in step 342, the value of '|R|−3−cTRMax−1' may be binarized using a k-th order EG code (sometimes referred to as EGk code), wherein k is a positive integer. For example, in an EGk binarization process of a syntax element denoted as synVal, an input of 'synVal=|R|−3−cTRMax−1' may generate an output bin string via a process equivalent to the following pseudo-code:

```
absV = Abs( synVal )
stopLoop = 0
```

-continued

```
do {
    if( absV >= ( 1 << k ) ) {
        put( 1 )
        absV = absV − ( 1 << k )
        k++
    } else {
        put( 0 )
        while( k− − )
            put( ( absV >> k ) & 1 )
        stopLoop = 1
    }
} while( !stopLoop )
```

Note that any appropriate value of k may be configured in the EGk code. In an embodiment, k=5. Compared with the 0-th order EG code used in the existing binarization scheme, the EGk code with a larger k, e.g., k=5, is more efficient in encoding a large value than the 0-th order EG code.

It should be understood that there may be variations of the method 300. For example, certain steps, such as checking of |R| values in steps 310 and 330, may be combined together if desired. Moreover, if one step does not depend on another step, they may be implemented simultaneously or sequentially in any order. Other steps or necessary processes may be added into the method 300 wherever appropriate to binarize a prediction residual level. Further, although the prediction residual level is used in the method 300 as an example, other types of syntax elements such as quantized residual level, transform coefficient, may also be binarized similarly using the method 300.

Figure 4:
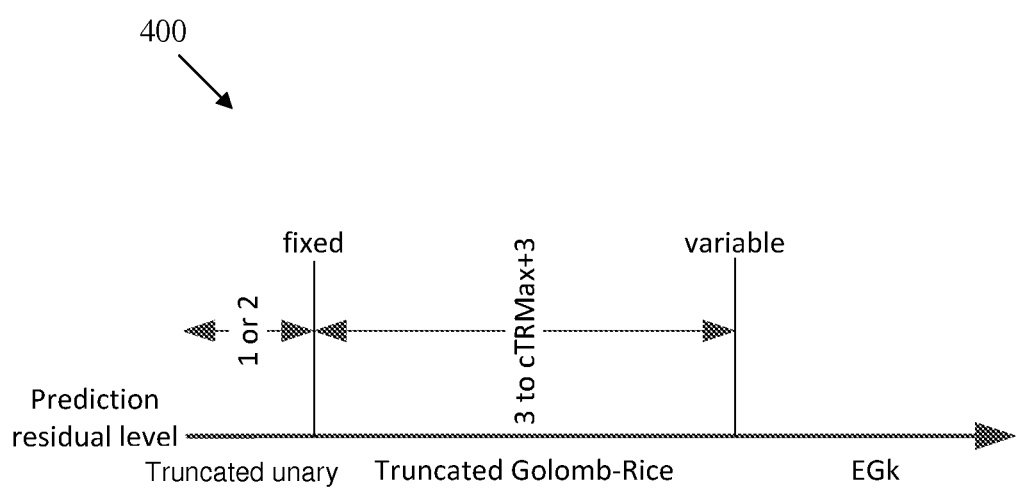
FIG. 4 is a schematic diagram of an embodiment of a binarization scheme.

FIG. 4 illustrates an embodiment of a binarization scheme 400, which may be implemented in a video codec. Depending on the value of a prediction residual level (i.e., |R|), its binary representation may include one, two, or three parts. In an embodiment, if |R| equals 1 or 2, |R| may be binarized as one part using a unary code in which 1 is binarized as "0" and 2 is binarized as "10". Otherwise if 3≤|R|≤cTRMax+3, |R| may be binarized as two parts, wherein a first part as bin string '11' and a second part comprising a prefix and remainder binarized using the TR code. Otherwise if |R|>cTRMax+3, |R| may be binarized as three parts, wherein a first part as bin string '11', a second part comprising a prefix and remainder binarized using the TR code, and a third part binarized using an EGk code.

Since prediction residuals may show spatial similarity or correlation, e.g., adjacent residual pixels with similar levels, to improve encoding efficiency, the Golomb-Rice parameter cRiceParam may be adaptively updated after encoding each residual pixel. After each update, an updated cRiceParam may be applied when encoding a next residual pixel. In an embodiment, cRiceParam may be updated according to a look-up table such as Table 3:

TABLE 3

Adaptive updating of cRiceParam

| | | \multicolumn{16}{c}{$\min(|R|_t - 3, 15)$} |
| $c_{t+1}$ | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| $c_t$ | 0 | 0 | 0 | 1 | 1 | 2 | 2 | 2 | 3 | 3 | 3 | 4 | 4 | 4 | 5 | 5 | 5 |
| | 1 | 1 | 1 | 1 | 2 | 2 | 2 | 3 | 3 | 3 | 4 | 4 | 4 | 5 | 5 | 5 | 5 |
| | 2 | 2 | 2 | 2 | 2 | 3 | 3 | 3 | 3 | 4 | 4 | 4 | 4 | 5 | 5 | 5 | 5 |
| | 3 | 3 | 3 | 3 | 3 | 3 | 4 | 4 | 4 | 4 | 4 | 4 | 5 | 5 | 5 | 5 | 5 |
| | 4 | 4 | 4 | 4 | 4 | 4 | 4 | 4 | 4 | 4 | 5 | 5 | 5 | 5 | 5 | 5 | 5 |
| | 5 | 5 | 5 | 5 | 5 | 5 | 5 | 5 | 5 | 5 | 5 | 5 | 5 | 5 | 5 | 5 | 5 |

In Table 3, a current cRiceParam for a current residual pixel $|R|_t$ is listed in the second column and denoted as $c_t$, a smaller value between '$|R|_t-3$' and 15 is listed in the second row and denoted as $\min(|R|_t, 15)$, and an updated cRiceParam for a next residual pixel is listed from the third row and third column and denoted as $c_{t+1}$. Each updated cRiceParam depends on the current cRiceParam and the current residual pixel. For example, if $|R|_t=9$ and $c_t=3$, based on Table 3, $c_{t+1}=4$, which indicates that the cRiceParam used to encode the next residual pixel should be 4.

Note that Table 3 may be modified under the principle that $c_{t+1}$ values do not decrease in each row from left to right or in each column from top to bottom. By using this principle, if the current residual level is smaller than the next residual level, the updated cRiceParam may be equal to or greater than the current cRiceParam, which reduces the number of necessary bits to binarize a prefix part in TR coding of the next residual level. Different patterns of $c_{t+1}$ values may affect the speed of updating or adaptation that may fit different types of video content. Further, the value of 15 used to compare with '$|R|_t-3$' may be used as a threshold to limit the size of the look-up table. Accordingly, the threshold may be configured differently, e.g., to be smaller or larger than 15. For example, the threshold may be configured to be 32, in which case only '$|R|_t-3<32$' are considered in cRiceParam updates. A higher threshold may lead to a lower frequency of updates, since it may require a larger prediction residual level to reach the largest cRiceParam.

Figure 5:
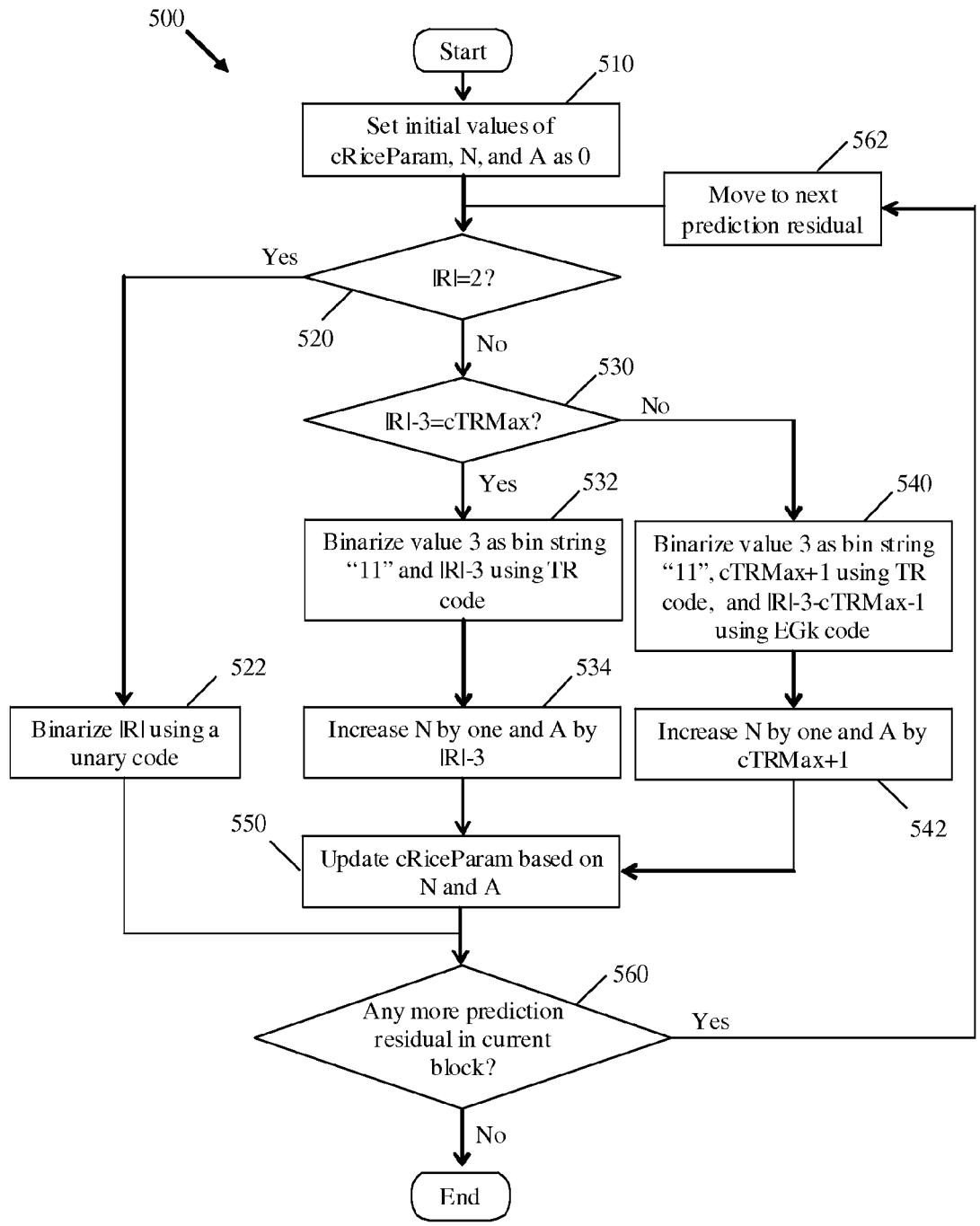
FIG. 5 is a flowchart of an embodiment of an adaptive Golomb-Rice parameter updating method.

FIG. 5 illustrates an embodiment of an adaptive cRiceParam updating method 500, which may be implemented in a video codec to encode absolute values of prediction residuals in a residual block. The method 500 may utilize a counter parameter, denoted as N, to indicate a number of prediction residuals (including a current prediction residual) that are coded using the TR code. The method 500 may also utilize an accumulator parameter, denoted as N, to indicate a summation of the absolute levels that have been binarized using the TR code (i.e., '|R|−3' for previous prediction residual and current prediction residual).

The method 500 may start in step 510, where the parameters cRiceParam, N, and A may be initialized to be 0. N=0 and A=0 suggest that no prediction residual in the current block (e.g., a CU) has been binarized using a TR code. Next, in step 520, the method 500 may check if a current residual level |R| is less than 3 (i.e., |R|≤2). If the condition in step 520 is met, the method 500 may proceed to step 522; otherwise, the method 500 may proceed to step 530. In step 522, |R| may be binarized using a unary code. For example, if |R| equals 1 or 2, it may be binarized as a bin string "0" or "10" respectively.

In step 530, the method 500 may check whether |R|−3≤cTRMax. If the condition in step 530 is met, the method 500 may proceed to step 532; otherwise, the method 500 may proceed to step 540. In step 532, the value of 3 may be coded using a bin string "11", and the value of '|R|−3' may be coded using a TR code. The TR code may use a current cRiceParam to code its prefix and remainder as described above. In step 534, the counter N may increase by one and the accumulator A may increase by '|R|−3', that is, N=N+1 and A=A+|R|−3.

In step 540, the value of 3 may be coded using a bin string "11", the value of 'cTRMax+1' may be coded using a TR code, and the value of '|R|−3−cTRMax−1' may be coded using a EGk code as described above. The TR code may use a current cRiceParam to code its prefix and remainder as described above. In step 542, N may increase by one and A may increase by 'cTRMax+1', that is, N=N+1 and A=A+cTRMax+1.

In step 550, the parameter cRiceParam may be updated based on N and A. In an embodiment, cRiceParam is computed using an algorithm equivalent to the following pseudo code:

for($i=0;(N<<i)<A;i++$)

cRiceParam=min($i$,5).

After updating cRiceParam, in step 560, the method 500 may check if there is any more prediction residual to be encoded in the current block. If the condition in step 560 is met, the method 500 may proceed to step 562; otherwise, the method 500 may end. In step 562, the method 500 may move to a next prediction residual. The process may be repeated until all non-zero prediction residual levels in the current block have been encoded.

As mentioned previously, sometimes a whole video frame may be encoded using a lossless scheme. Other times, a portion of blocks (e.g., CUs) in a video frame may be encoded using a lossless scheme, while other blocks may be coded using a lossy scheme. To allow a decoder to correctly decode a bitstream comprising encoded prediction residuals, various mechanisms are disclosed herein to indicate lossless coding of a video frame or blocks in the video frame. For example, in HEVC we may indicate lossless coding of a CU by setting its quantization parameter (QP) to equal 0. An advantage of utilizing the existing QP to indicate a lossless coding mode may be that no new parameter or syntax element needs to be introduced to the bit stream. As a result, the coding performance of HEVC in a lossy mode may not be impacted or compromised after incorporation of the lossless mode.

Figure 6:
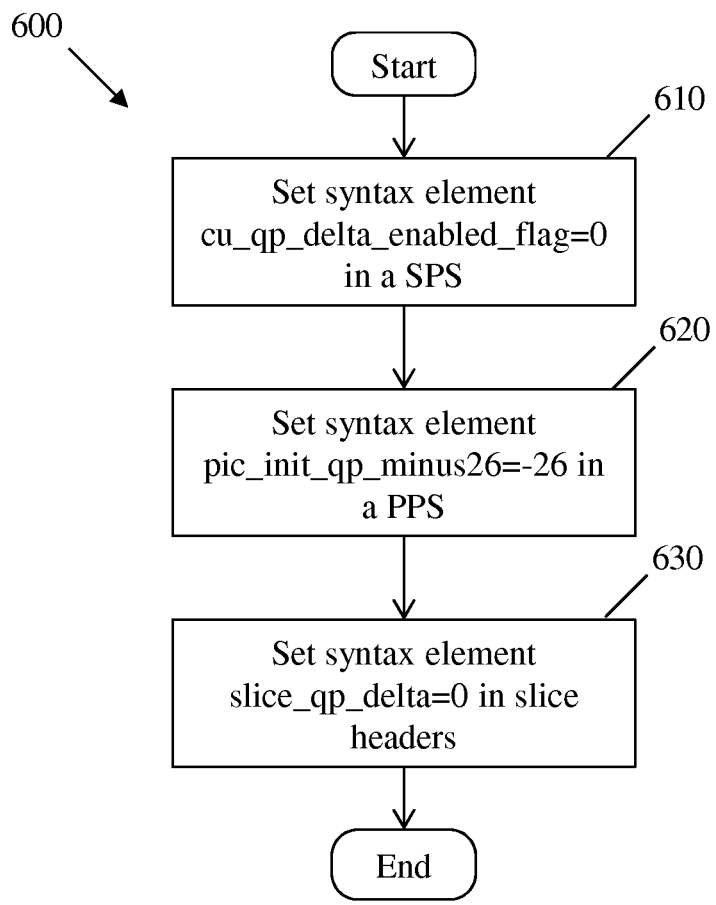
FIG. 6 is a flowchart of an embodiment of a lossless coding indication method.

FIG. 6 illustrates an embodiment of a lossless coding indication method 600, which may be implemented in a video encoder to indicate that a whole image or video picture is encoded using a lossless encoding scheme. The method 600 may set a number of syntax elements, which are included in the bit stream comprising encoded prediction residuals. The method 600 may start in step 610, where a first syntax element enabling QP flagging or configuration on the CU level may be disabled or turned off in a sequence parameter set (SPS) of the bit stream. In an embodiment, the first syntax element is set as: cu_qp_delta_enabled_flag=0. In step 620, a second syntax element, which specifies an initial value of QP for the video slice minus 26, may be set in a picture parameter set (PPS) of the bit stream. In an embodiment, the second syntax element is set as: pic_init_qp_minus26=−26. In step 630, a third syntax element, which specifies a difference between the slice QP value and the initial QP value for video pictures associated with the PPS, may be set in all non-lightweight slice headers associated with the video picture. In an embodiment, the third syntax element is set as: slice_qp_delta=0.

Based on the setting of the three syntax elements in the method 600, QP=0 for all CUs in the video slice or frame, which indicates lossless coding for the whole video frame. It should be noted that the steps in the method 600 may be implemented simultaneously or in any sequential order.

Figure 7:
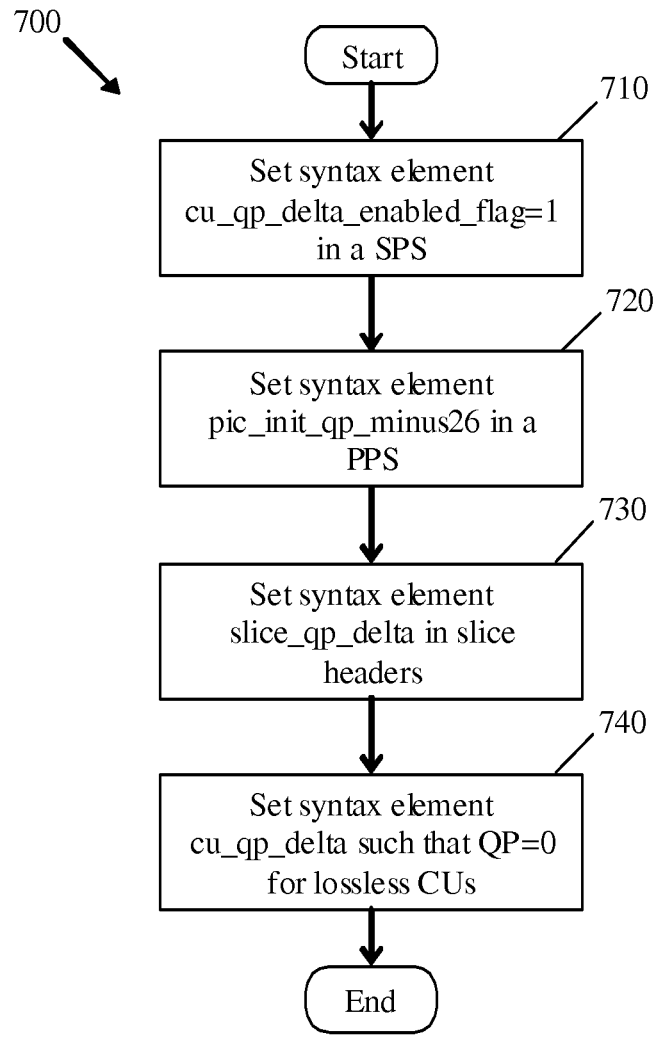
FIG. 7 is a flowchart of another embodiment of a lossless coding indication method.

FIG. 7 illustrates another embodiment of a lossless coding indication method 700, which may be implemented in a video encoder to indicate which CUs in an image or video frame are encoded using a lossless encoding scheme and which CUs in the video frame are encoded using a lossy encoding scheme. The method 700 may set a number of syntax elements, which are included in the bit stream comprising encoded prediction residuals. The method 700 may start in step 710, where a first syntax element enabling QP flagging or configuration on the CU level may be enabled or turned on in a sequence parameter set (SPS) of the bit stream. In an embodiment, the first syntax element is set as: cu_qp_delta_enabled_flag=1 for the video frame. In step 720, a second syntax element, which specifies an initial value of QP for the video picture minus 26, may be set in a picture parameter set (PPS) of the bit stream. In step 730, a third syntax element, which specifies a difference between the slice QP value and the initial QP value for video pictures associated with the PPS, may be set in all non-lightweight slice headers associated with the video picture. In step 740, a fourth syntax element, which specifies a difference between the QP value for a CU and its slice QP value may be set. In an embodiment, the fourth syntax element, denoted as cu_qp_delta, is set such that QP=0 for lossless CUs and QP≠0 for lossy CUs. It should be noted that the steps in the method 700 may be implemented simultaneously or in any sequential order.

Figure 8:
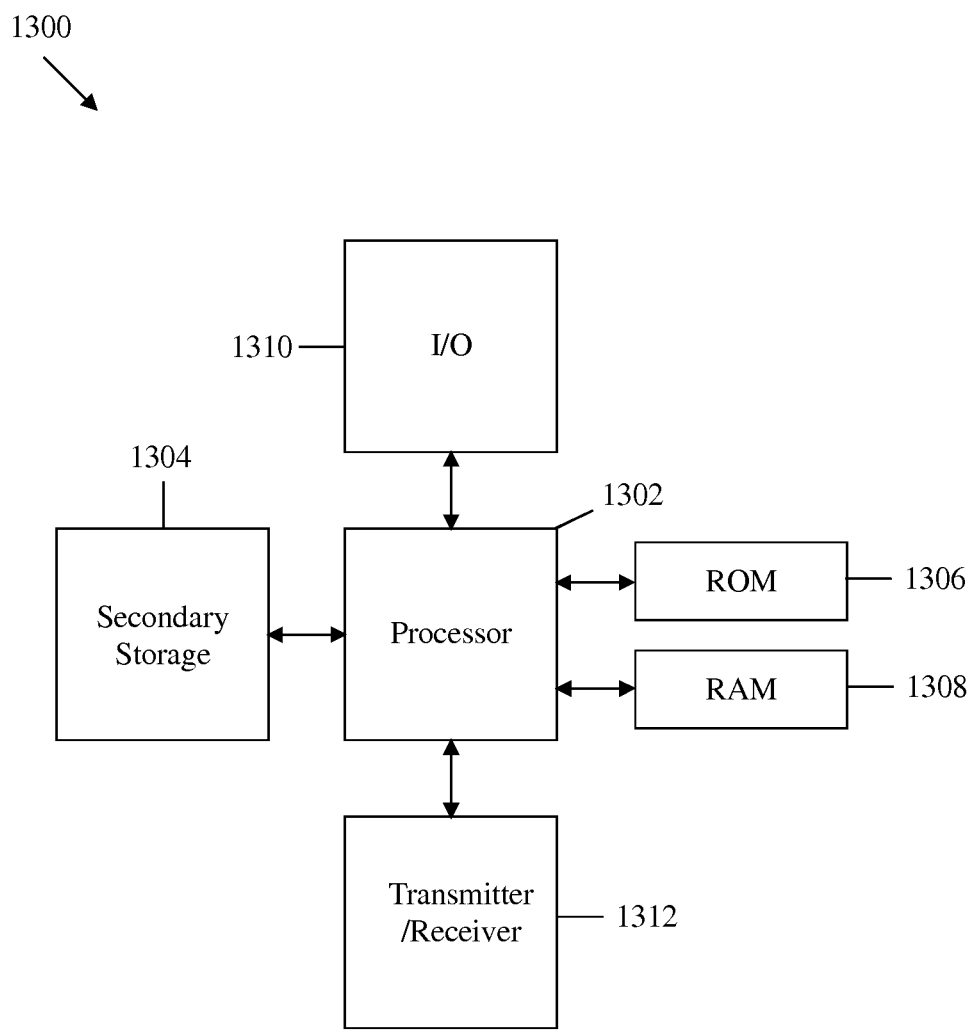
FIG. 8 is a schematic diagram of a computer system.

The schemes described above may be implemented on a network component, such as a computer or network component with sufficient processing power, memory resources, and network throughput capability to handle the necessary workload placed upon it. FIG. 8 illustrates an embodiment of a network component or computer system 1300 suitable for implementing one or more embodiments of the methods disclosed herein, such as the transform bypass encoding scheme 100, the transform bypass decoding scheme 200, the binarization method 300, the binarization scheme 400, the adaptive cRiceParam updating method 500, the lossless coding indication method 600, and the lossless coding indication method 700. The network component or computer system 1300 includes a processor 1302 that is in communication with memory devices including secondary storage 1304, read only memory (ROM) 1306, random access memory (RAM) 1308, input/output (I/O) devices 1310, and transmitter/receiver 1312. Although illustrated as a single processor, the processor 1302 is not so limited and may comprise multiple processors. The processor 1302 may be implemented as one or more central processor unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1302 may be configured to implement any of the schemes described herein, including the transform bypass encoding scheme 100, the transform bypass decoding scheme 200, the binarization method 300, the binarization scheme 400, the adaptive cRiceParam updating method 500, the lossless coding indication method 600, and the lossless coding indication method 700. The processor 1302 may be implemented using hardware or a combination of hardware and software.

The secondary storage 1304 is typically comprised of one or more disk drives or tape drives and is used for non-volatile storage of data and as an over-flow data storage device if the RAM 1308 is not large enough to hold all working data. The secondary storage 1304 may be used to store programs that are loaded into the RAM 1308 when such programs are selected for execution. The ROM 1306 is used to store instructions and perhaps data that are read during program execution. The ROM 1306 is a non-volatile memory device that typically has a small memory capacity relative to the larger memory capacity of the secondary storage 1304. The RAM 1308 is used to store volatile data and perhaps to store instructions. Access to both the ROM 1306 and the RAM 1308 is typically faster than to the secondary storage 1304.

The transmitter/receiver 1312 may serve as an output and/or input device of the computer system 1300. For example, if the transmitter/receiver 1312 is acting as a transmitter, it may transmit data out of the computer system 1300. If the transmitter/receiver 1312 is acting as a receiver, it may receive data into the computer system 1300. The transmitter/receiver 1312 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 1312 may enable the processor 1302 to communicate with an Internet or one or more intranets. I/O devices 1310 may include a video monitor, liquid crystal display (LCD), touch screen display, or other type of video display for displaying video, and may also include a video recording device for capturing video. I/O devices 1310 may also include one or more keyboards, mice, or track balls, or other well-known input devices.

It is understood that by programming and/or loading executable instructions onto the computer system 1300, at least one of the processor 1302, the secondary storage 1304, the RAM 1308, and the ROM 1306 are changed, transforming the computer system 1300 in part into a particular machine or apparatus (e.g., a video codec having the novel functionality taught by the present disclosure). The executable instructions may be stored on the secondary storage 1304, the ROM 1306, and/or the RAM 1308 and loaded into the processor 1302 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A video codec comprising:
a memory; and
a processor operably coupled to the memory and configured to:
compute a difference between an original pixel and a prediction pixel to generate a prediction residual;
binarize an absolute value of the prediction residual, wherein binarizing |R| comprises using a truncated Golomb-Rice (TR) code with a Golomb-Rice parameter when the absolute value of the prediction residual, denoted as |R|, is greater than 2, and wherein the Golomb-Rice parameter is denoted as cRiceParam, is an integer, and has a valid range from 0 to n, where n is greater than 3;
compute a difference between a second original pixel and a second prediction pixel to generate a second prediction residual; and
binarize an absolute value of the second prediction residual, wherein binarizing the absolute value of the second prediction residual comprises using an updated cRiceParam when the absolute value of the second prediction residual is greater than 2, and wherein the updated cRiceParam is adaptively based on |R| and the cRiceParam,
wherein the prediction residual and the second prediction residual are binarized without any prior or subsequent transform and quantization steps being performed, and wherein the prediction residual and the second prediction residual are used for coding of a video frame.

2. The video codec of claim 1, wherein cRiceParam determines another parameter denoted as cTRMax, wherein when |R|-3>cTRMax, binarizing cRiceParam comprises using a k-th order exponential Golomb (EG) code, and wherein k is a positive integer.

3. The video codec of claim 2, wherein cRiceParam and cTRMax are specified according to following table:

| cRiceParam | cTRMax |
|---|---|
| 0 | 7 |
| 1 | 20 |
| 2 | 42 |
| 3 | 70 |
| 4 | 142 |
| 5 | 252. |

4. The video codec of claim 1, wherein the processor is further configured to determine a minimum value between |R|-3 and a threshold, wherein the threshold is a preconfigured integer greater than 14, and wherein the updated cRiceParam is no less than the cRiceParam when the minimum value equals |R|-3.

5. The video codec of claim 1, wherein the cRiceParam is denoted as $c_t$, wherein the updated cRiceParam is denoted as $c_{t+1}$, wherein the processor is further configured to determine a minimum value between |R|-3 and 15, and wherein $c_{t+1}$ is determined by the minimum value and $C_t$ via the following table:

|  |  | min(|R| − 3, 15) | | | | | | | | | | | | | | |
|---|---|---|---|---|---|---|---|---|---|---|---|---|---|---|---|---|
| $c_{t+1}$ |  | 0 | 1 | 2 | 3 | 4 | 5 | 6 | 7 | 8 | 9 | 10 | 11 | 12 | 13 | 14 | 15 |
| $c_t$ | 0 | 0 | 0 | 1 | 1 | 2 | 2 | 2 | 3 | 3 | 3 | 4 | 4 | 4 | 5 | 5 | 5 |
|  | 1 | 1 | 1 | 1 | 2 | 2 | 2 | 3 | 3 | 3 | 4 | 4 | 4 | 5 | 5 | 5 | 5 |
|  | 2 | 2 | 2 | 2 | 2 | 3 | 3 | 3 | 3 | 4 | 4 | 4 | 4 | 5 | 5 | 5 | 5 |
|  | 3 | 3 | 3 | 3 | 3 | 3 | 4 | 4 | 4 | 4 | 4 | 5 | 5 | 5 | 5 | 5 | 5 |
|  | 4 | 4 | 4 | 4 | 4 | 4 | 4 | 4 | 4 | 4 | 5 | 5 | 5 | 5 | 5 | 5 | 5 |
|  | 5 | 5 | 5 | 5 | 5 | 5 | 5 | 5 | 5 | 5 | 5 | 5 | 5 | 5 | 5 | 5 | 5. |

6. A video codec comprising:
a memory; and
a processor operably coupled to the memory and configured to:
compute a difference between an original pixel and a prediction pixel to generate a prediction residual; and
binarize an absolute value of the prediction residual, wherein binarizing |R| comprises using a truncated Golomb-Rice (TR) code with a Golomb-Rice parameter when the absolute value of the prediction residual, denoted as |R|, is greater than 2, and wherein the Golomb-Rice parameter is denoted as cRiceParam, is an integer, and has a valid range from 0 to n, where n is greater than 3;
generate a plurality of prediction residuals including the prediction residual and a second prediction residual, wherein the plurality of prediction residuals are located in one block and each has a non-zero absolute value;
update the cRiceParam to generate an updated cRiceParam after binarizing |R|, wherein updating the cRiceParam is based on a counter and an accumulator, wherein the counter specifies a number of prediction residuals that have been binarized using the TR code, wherein the accumulator specifies a summation of each absolute value of the prediction residuals that have been binarized using the TR code minus 3; and binarize the absolute value of the second prediction residual using the TR code with the updated cRiceParam when an absolute value of the second prediction residual is greater than 2, wherein the prediction residual and the second prediction residual are binarized without any prior or subsequent transform and quantization steps being performed, and wherein the prediction residual and the second prediction residual are used for coding of a video frame.

7. The video codec of claim 6, wherein the counter is denoted as N, wherein the accumulator is denoted as A, and wherein N increases by one and A increases by |R|-3 when 2<|R|≤cTRMax+3, otherwise N increases by one and A increases by cTRMax+3 when |R|>cTRMax+3.

8. The video codec of claim 7, wherein the updated cRiceParam is computed as:

for($i=0$; ($N<<i$)<$A$; $i$++); where cRiceParam=min($i$, 5).

9. A method for video coding in a video coder, comprising:

computing, by the video coder, a difference between an original pixel and a prediction pixel to generate a prediction residual;

binarizing, by the video coder, an absolute value of the prediction residual;

computing, by the video coder, a difference between a second original pixel and a second prediction pixel, to generate a second prediction residual; and binarizing, by the video coder, an absolute value of the second prediction residual, wherein binarizing the absolute value of the second prediction residual comprises using an updated cRiceParam when the absolute value of the second prediction residual is greater than 2, and wherein the updated cRiceParam is adaptively based on |R| and the cRiceParam, wherein the prediction residual and the second prediction residual are binarized without any prior or subsequent transform and quantization steps being performed, and wherein the prediction residual and the second prediction residual are used for coding of a video frame.

10. The method of claim 9, wherein binarizing |R| comprises using a truncated Golomb-Rice (TR) code with a Golomb-Rice parameter when the absolute value of the prediction residual, denoted as |R|, is greater than 2, and wherein the Golomb-Rice parameter is denoted as cRiceParam, is an integer, and has a valid range from 0 to n, where n is greater than 3.

11. The method of claim 10, wherein cRiceParam determines another parameter denoted as cTRMax, wherein binarizing cRiceParam comprises using a k-th order exponential Golomb (EG) code when |R1|-3>cTRMax, and wherein k is a positive integer.

12. The method of claim 9, further comprising determining a minimum value between |R|-3 and a threshold, wherein the threshold is a pre-configured integer greater than 14, and wherein the updated cRiceParam is no less than the cRiceParam when the minimum value equals |R|-3.

13. A method for video coding in a video coder, comprising:

computing, by the video coder, a difference between an original pixel and a prediction pixel to generate a prediction residual;

binarizing, by the video coder, an absolute value of the prediction residual, wherein binarizing |R| comprises using a truncated Golomb-Rice (TR) code with a Golomb-Rice parameter when the absolute value of the prediction residual, denoted as |R|, is greater than 2, and wherein the Golomb-Rice parameter is denoted as cRiceParam, is an integer, and has a valid range from 0 to n, where n is greater than 3;

generating, by the video coder, a plurality of prediction residuals including the prediction residual and a second prediction residual, wherein the plurality of prediction residuals are located in one block and each has a non-zero absolute value;

updating, by the video coder, the cRiceParam to generate an updated cRiceParam after binarizing |R|, wherein updating the cRiceParam is based on a counter and an accumulator, wherein the counter specifies a number of prediction residuals that have been binarized using the TR code, wherein the accumulator specifies a summation of each absolute value of the prediction residuals that have been binarized using the TR code minus 3; and binarizing, by the video coder, the absolute value of the second prediction residual using the TR code with the updated cRiceParam when an absolute value of the second prediction residual is greater than 2, wherein the prediction residual the second prediction residual are binarized without any prior or subsequent transform and quantization steps being performed, and wherein the prediction residual and the second prediction residual are used for coding of a video frame.

14. A video encoder comprising:

a processor configured to set a number of syntax elements to indicate lossless encoding of some or all coding units (CU) in a video frame; and a transmitter operably coupled to the processor and configured to transmit a bit stream comprising the syntax elements to a video device in communication with the video encoder, wherein a first syntax element is set to disable quantization parameter (QP) configuration on a CU level, wherein the first syntax element is included in a sequence parameter set (SPS) of the bit stream, and wherein the first syntax element is binarized without any prior or subsequent transform and quantization steps being performed.

15. The video encoder of claim 14, wherein a second syntax element is set to specify an initial value of QP for the video frame minus 26, wherein the second syntax element is included in a picture parameter set (PPS) of the bit stream, wherein a third syntax element is set to specify a difference between a slice QP value and the initial value of QP for the video frame, wherein the third syntax element is included in slice headers associated with the video frame.

16. The video encoder of claim 15, wherein the first syntax element is set as cu_qp_delta_enabled_flag=0, wherein the second syntax element is set as pic_init_qp_minus26=26, and wherein the third syntax element is set as slice_qp_delta=0.

17. A video encoder comprising:
a processor configured to set a number of syntax elements to indicate lossless encoding of some or all coding units (CU) in a video frame;
a transmitter operably coupled to the processor and configured to transmit a bit stream comprising the syntax elements to a video decoder for use in generating a visual image on a display device,
wherein a first syntax element is set to enable quantization parameter (QP) configuration on a CU level,
wherein the first syntax element is included in a sequence parameter set (SPS) of the bit stream, and
wherein the first syntax element is binarized without any prior or subsequent transform and quantization steps being performed.

18. The video encoder of claim 17, wherein a second syntax element is set to identify an initial value of QP for the video frame minus 26, wherein the second syntax element is included in a picture parameter set (PPS) of the bit stream, wherein a third syntax element is set to specify a difference between a slice QP value and the initial value of QP for the video frame, wherein a fourth syntax is set to specify a difference between a QP value for a CU and the slice QP value.

19. The video encoder of claim 18, wherein lossless encoding of the CU is indicated by setting the first syntax element as cu_qp_delta_enabled_flag=1, the second syntax element as pic_init_qp_minus26=26, and the third syntax element as slice_qp_delta=0.

20. A method for video encoding in a video coder, comprising:
setting, by the video coder, a number of syntax elements to indicate lossless encoding of some or all coding units (CU) in a video frame; and
transmitting, by the video coder, a bit stream comprising the syntax elements to a video decoder for use in generating a visual image on a display device,
wherein a first syntax element is set to disable quantization parameter (QP) configuration on a CU level,
wherein the first syntax element is included in a sequence parameter set (SPS) of the bit stream,
wherein a second syntax element is set to specify an initial value of QP for the video frame minus 26,
wherein the second syntax element is included in a picture parameter set (PPS) of the bit stream,
wherein a third syntax element is set to specify a difference between a slice QP value and the initial value of QP for the video frame,
wherein the third syntax element is included in slice headers associated with the video frame, and
wherein the syntax elements are binarized without any prior or subsequent transform and quantization steps being performed.

21. A method for video encoding in a video coder, comprising:
setting, by the video coder, a number of syntax elements to indicate lossless encoding of some or all coding units (CU) in a video frame; and
transmitting, by the video coder, a bit stream comprising the syntax elements to a video decoder for use in generating a visual image on a display device,
wherein a first syntax element is set to enable quantization parameter (QP) configuration on a CU level,
wherein the first syntax element is included in a sequence parameter set (SPS) of the bit stream,
wherein a second syntax element is set to identify an initial value of QP for the video frame minus 26,
wherein the second syntax element is included in a picture parameter set (PPS) of the bit stream,
wherein a third syntax element is set to specify a difference between a slice QP value and the initial value of QP for the video frame,
wherein a fourth syntax is set to specify a difference between a QP value for a CU and the slice QP value, and
wherein the syntax elements are binarized without any prior or subsequent transform and quantization steps being performed.

* * * * *

UNITED STATES PATENT AND TRADEMARK OFFICE
CERTIFICATE OF CORRECTION

PATENT NO. : 9,503,750 B2
APPLICATION NO. : 13/668112
DATED : November 22, 2016
INVENTOR(S) : Wen Gao et al.

It is certified that error appears in the above-identified patent and that said Letters Patent is hereby corrected as shown below:

On the Title Page

Page 3, Column 1, item [56], References Cited, Other Publications should read:
Davies, T. et al., "Suggestion for a Test Model," Joint Collaborative Team on Video Coding (JCT-VC) of ITU-T SG16 WP3 and ISO/IEC JTC1/SC29/WG11, 1st Meeting: Dresden, DE, 2010, JCTVC-A033, April 15-23, pages 1-30.

Page 3, Column 2, item [56], References Cited, Other Publications should read:
"Vision, Application and Requirements for High Efficiency Video Coding (HEVC)," ISO/IEC JTC1/SC29/WG11/N11872, Daegu, Korea, January 2011, 6 pages.

In the Claims

Column 18, Lines 1-38, Claim 13, should read:
13. A method for video coding in a video coder, comprising:
 computing, by the video coder, a difference between an original pixel and a prediction pixel to generate a prediction residual;
 binarizing, by the video coder, an absolute value of the prediction residual, wherein binarizing |R| comprises using a truncated Golomb-Rice (TR) code with a Golomb-Rice parameter when the absolute value of the prediction residual, denoted as |R|, is greater than 2, and wherein the Golomb-Rice parameter is denoted as cRiceParam, is an integer, and has a valid range from 0 to n, where n is greater than 3;
 generating, by the video coder, a plurality of prediction residuals including the prediction residual and a second prediction residual, wherein the plurality of prediction residuals are located in one block and each has a non-zero absolute value;
 updating, by the video coder, the cRiceParam to generate an updated cRiceParam after binarizing |R|, wherein updating the cRiceParam is based on a counter and an accumulator, wherein the counter specifies a number of prediction residuals that have been binarized using the TR code, Signed and Sealed this
Eleventh Day of July, 2017

Joseph Matal
*Performing the Functions and Duties of the*
*Under Secretary of Commerce for Intellectual Property and*
*Director of the United States Patent and Trademark Office* wherein the accumulator specifies a summation of each absolute value of the prediction residuals that have been binarized using the TR code minus 3; and binarizing, by the video coder, the absolute value of the second prediction residual using the TR code with the updated cRiceParam when an absolute value of the second prediction residual is greater than 2, wherein the prediction residual and the second prediction residual are binarized without any prior or subsequent transform and quantization steps being performed, and wherein the prediction residual and the second prediction residual are used for coding of a video frame.